US012617044B2

(12) United States Patent
Takada et al.

(10) Patent No.: US 12,617,044 B2
(45) Date of Patent: May 5, 2026

(54) SOLID WIRE FOR GAS METAL ARC WELDING

(71) Applicant: JFE Steel Corporation, Tokyo (JP)

(72) Inventors: Atsushi Takada, Tokyo (JP); Keiji Ueda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 672 days.

(21) Appl. No.: 18/016,015

(22) PCT Filed: Jul. 13, 2021

(86) PCT No.: PCT/JP2021/026319
§ 371 (c)(1),
(2) Date: Jan. 13, 2023

(87) PCT Pub. No.: WO2022/030200
PCT Pub. Date: Feb. 10, 2022

(65) Prior Publication Data
US 2023/0211441 A1 Jul. 6, 2023

(30) Foreign Application Priority Data

Aug. 3, 2020 (JP) ................................. 2020-131365

(51) Int. Cl.

| | |
|---|---|
| *B23K 35/02* | (2006.01) |
| *B23K 9/00* | (2006.01) |
| *B23K 9/173* | (2006.01) |
| *B23K 35/30* | (2006.01) |
| *B23K 35/38* | (2006.01) |
| *C22C 38/00* | (2006.01) |
| *C22C 38/02* | (2006.01) |
| *C22C 38/06* | (2006.01) |
| *C22C 38/08* | (2006.01) |
| *C22C 38/22* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/58* | (2006.01) |
| *B23K 101/12* | (2006.01) |

(52) U.S. Cl.
CPC ........ *B23K 35/0261* (2013.01); *B23K 9/0026* (2013.01); *B23K 9/173* (2013.01); *B23K 35/3073* (2013.01); *B23K 35/383* (2013.01); *C22C 38/001* (2013.01); *C22C 38/005* (2013.01); *C22C 38/02* (2013.01); *C22C 38/06* (2013.01); *C22C 38/08* (2013.01); *C22C 38/22* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *B23K 2101/12* (2018.08)

(58) Field of Classification Search
None
See application file for complete search history.

(56) References Cited

U.S. PATENT DOCUMENTS

| | | | |
|---|---|---|---|
| 10,864,605 B2 | 12/2020 | Lee et al. | |
| 11,130,204 B2 | 9/2021 | Wasson et al. | |
| 2018/0021895 A1* | 1/2018 | Wasson .................. | C22C 38/02 |
| | | | 420/73 |
| 2019/0226048 A1 | 7/2019 | Kimura et al. | |

FOREIGN PATENT DOCUMENTS

| | | |
|---|---|---|
| CN | 105728978 A | 7/2016 |
| CN | 109530881 A | 3/2019 |
| EP | 3037205 A1 | 6/2016 |
| EP | 3 838 474 A1 | 6/2021 |
| JP | 60121099 A | 6/1985 |
| JP | H0569141 A | 3/1993 |
| JP | H10128576 A | 5/1998 |
| JP | 2011-056539 A | 3/2011 |
| JP | 2017502842 A | 1/2017 |
| JP | 2018059190 A | 4/2018 |
| JP | 2019519675 A | 7/2019 |
| JP | 6621572 B1 | 12/2019 |
| KR | 10-2015-0066192 A | 6/2015 |
| KR | 10-2015-0105623 A | 9/2015 |
| WO | 2020/039643 A1 | 2/2020 |

OTHER PUBLICATIONS

CN 109530881 A (Mao, Xing-gui et al.) Mar. 29, 2019 [retrieved on Nov. 1, 2025]. Retrieved from Foreign Image and Text database, translation by Clarivate Analytics. (Year: 2019).*
Chinese Office Action issued Apr. 30, 2024, by the State Intellectual Property Office of People's Republic of China in corresponding Chinese Patent Application No. 202180060232.4 and an English translation of the Search Report. (10 pages).
Office Action (Request for the Submission of an Opinion) issued Nov. 12, 2024, by the Korean Intellectual Property Office in corresponding Korean Patent Application No. 10-2023-7001869 and an English translation of the Office Action. (13 pages).

(Continued)

*Primary Examiner* — John J Norton
(74) *Attorney, Agent, or Firm* — Buchanan Ingersoll & Rooney PC

(57) ABSTRACT

Provided is a solid wire for gas metal arc welding, solid wire being suitable as a welding material for high-Mn steel materials and generating less fume during welding. The solid wire of the present invention has a composition containing, in mass %, C: 0.20 to 0.80%, Si: 0.15 to 0.90%, Mn: 15.0 to 30.0%, P: 0.030% or less, S: 0.030% or less, Al: 0.020% or less, Ni: 0.01 to 10.00%, Cr: 6.0 to 15.0%, Mo: 0.01 to 3.50%, O: 0.010% or less, N: 0.120% or less, and the balance being Fe and incidental impurities.

10 Claims, No Drawings

(56) References Cited

OTHER PUBLICATIONS

Office Action (Rejection decision) issued Jan. 24, 2025, by the State Intellectual Property Office of People's Republic of China in corresponding Chinese Patent Application No. 202180060232.4 and an English machine translation with Concise Statement of Relevance of the Office Action. (28 pages).

International Search Report and Written Opinion for International Application No. PCT/JP2021/026319, dated Sep. 21, 2021, 5 pages.

Extended European Search Report issued Mar. 13, 2025, by the European Patent Office in corresponding European Patent Application No. 21853890.8-1103. (60 pages).

"Electric Welder—Intermediate Level", Shanghai Electric (Group) Corporation Shanghai Science and Technology Press, (Aug. 31, 2001), p. 139, with English translation. (2 pages).

Zhang, "Welding Cracks and Quality Control of Boilers and Pressure Vessels", Tianjin Science and Technology Press, (Jun. 30, 1985), p. 128 with English translation. (2 pages).

Office Action (The Second Office Action) issued Oct. 25, 2024, by the State Intellectual Property Office of People's Republic of China in corresponding Chinese Patent Application No. 202180060232.4 and an English translation of the Office Action. (22 pages).

* cited by examiner

SOLID WIRE FOR GAS METAL ARC WELDING

CROSS REFERENCE TO RELATED APPLICATIONS

This is the U.S. National Phase application of PCT/JP2021/026319, filed Jul. 13, 2021 which claims priority to Japanese Patent Application No. 2020-131365, filed Aug. 3, 2020.

FIELD OF THE INVENTION

The present invention relates to solid wires for gas metal arc welding, and particularly relates to a solid wire for welding high-Mn steel materials used in cryogenic environments.

BACKGROUND OF THE INVENTION

Environmental regulations have been strengthened in recent years. Liquefied natural gas (hereinafter, also referred to as LNG), which does not contain any sulfur, is regarded as a clean fuel that does not generate air pollutants such as sulfide oxides. Accordingly, the demand on LNG is increasing. To transport or store LNG, a container (tank) for transporting or storing LNG is required to maintain excellent cryogenic impact toughness at a temperature of −162° C., which is the liquefaction temperature of LNG, or less.

Due to the necessity to maintain excellent cryogenic impact toughness, aluminum alloys, 9% Ni steels, austenite stainless steels, etc., have been used as materials for the containers (tanks) and the like.

However, aluminum alloys have a low tensile strength and pose problems in that the structure needs to be designed to have a large thickness. Furthermore, aluminum alloys have a poor weldability. In addition, 9% Ni steel is economically disadvantageous because use of an expensive Ni-based material as a welding material is required. Furthermore, austenite stainless steel is expensive and has a problem of low base material strength.

Because of these problems, application of high-Mn-content steel (hereinafter, also referred to as high-Mn steel) having a Mn content of about 10% to 35% in mass % to the material for containers (tanks) for transporting or storing LNG has recently been studied. The features of the high-Mn steel are that the high-Mn steel is in an austenite phase even at cryogenic temperatures, thereby preventing brittle fracture, and has high strength compared to austenite stainless steel. Therefore, development of a welding material with which such high-Mn steel materials can be welded stably has been demanded.

To meet this demand, for example, Patent Literature 1 proposes "a high-strength weld joint having excellent cryogenic impact toughness and a wire for flux cored arc welding therefor". The flux cored wire for arc welding described in Patent Literature 1 has a composition containing, in weight %, C: 0.15% to 0.8%, Si: 0.2% to 1.2%, Mn: 15% to 34%, Cr: 6% or less, Mo: 1.5% to 4%, S: 0.02% or less, P: 0.02% or less, B: 0.01% or less, Ti: 0.09% to 0.5%, N: 0.001% to 0.3%, $TiO_2$: 4 to 15%, a total of at least one selected from $SiO_2$, $ZrO_2$, and $Al_2O_3$: 0.01% to 9%, a total of at least one selected from K, Na, and Li: 0.5% to 1.7%, at least one of F and Ca: 0.2% to 1.5%, and the balance being Fe and incidental impurities. When welding is performed using the flux cored wire for arc welding described in Patent Literature 1, it is possible to effectively obtain a weld joint having excellent low-temperature toughness of an absorbed energy of 28 J or more in a Charpy impact test at a test temperature of −196° C. and high strength of a room temperature tensile strength of 400 MPa or more. In addition, the wire composition is adjusted to Mo: 1.5% or more, and a weld joint having excellent hot crack resistance can be securely obtained.

PATENT LITERATURE

PTL 1: JP 2017-502842 A

SUMMARY OF THE INVENTION

However, according to the study conducted by the inventors of the present invention, the technique described in Patent Literature 1 has a problem that a large amount of fume is generated during welding. Therefore, a welder is exposed to an environment containing a large amount of fume.

An object according to aspects of the present invention is to address the problems of the related art mentioned above by providing a solid wire for gas metal arc welding which generates less fume during welding, suitable as a welding material for high-Mn steel materials used in cryogenic environments and enabling manufacture of a weld joint that has both high strength and excellent cryogenic toughness.

Here, "generating less fume during welding" means that, when gas metal arc welding is performed in accordance with JIS Z 3930-2013 with a shielding gas composition of 80% Ar+20% $CO_2$ and a welding current of 250 A, the fume generation amount is 1200 mg/min or less.

Furthermore, "high strength" means that the room-temperature yield strength (0.2% proof stress) of a deposited metal prepared in accordance with JIS Z 3111 is 400 MPa or more, and "excellent cryogenic toughness" means that a deposited metal prepared in accordance with JIS Z 3111 has an absorbed energy $vE_{-196}$ of 28 J or more in a Charpy impact test at a test temperature of −196° C.

The inventors have first intensively studied factors that affect the fume generation amount during gas metal arc welding. As a result, the inventors have discovered that it is effective to use a solid wire as a welding material rather than a flux cored wire to significantly reduce the fume generation amount. However, a solid wire, which needs more working than a flux cored wire during wire drawing, has a problem in that cracks and breaks are likely to occur during the wire drawing, especially when the wire composition is a high-Mn-content composition. Thus, the manufacturability of the solid wire is degraded.

To address this, the inventors of the present invention have intensively studied factors that affect the manufacturability of the wire. The studies on the fracture surface where cracks and breaks have occurred have found that coarse $Al_2O_3$ of 10 μm or larger has served as a starting point. Thus, it has been found that suppressing formation of coarse $Al_2O_3$ would enable wire drawing without occurrence of defects such as cracks. In addition, it has been found that it is critical for suppressing formation of coarse $Al_2O_3$ to adjust the wire composition such that the Al content is 0.020% or less and the oxygen (O) content is 0.010% or less in terms of mass %.

Next, the inventors have studied on a solid wire composition necessary for generating less fume during welding and for obtaining a deposited metal that is prepared in accordance with JIS Z 3111 and has both the desired high strength and the desired excellent cryogenic toughness, while maintaining wire manufacturability that enables the aforementioned wire drawing. As a result, it has been found that the solid wire needs to have a composition in which the C content and the Si content in mass % are adjusted to be within the ranges of C: 0.20 to 0.80% and Si: 0.15 to 0.90%, the Mn content, the Ni, content, the Cr content, and the Mo content are adjusted to be within the specified ranges of Mn: 15.0 to 30.0%, Ni: 0.01 to 10.00%, Cr: 6.0 to 15.0%, and Mo: 0.01 to 3.50%, and, furthermore, the Al content and the impurity oxygen (O) content are decreased to Al: 0.020% or less and O: 0.010% or less.

Aspects of the present invention have been accomplished based on the above findings and further studies.

The gist of aspects of the present invention is as follows.

[1] A solid wire for gas metal arc welding, the solid wire having a composition that contains, in mass %, C: 0.20 to 0.80%,
    Si: 0.15 to 0.90%,
    Mn: 15.0 to 30.0%,
    P: 0.030% or less,
    S: 0.030% or less,
    Al: 0.020% or less,
    Ni: 0.01 to 10.00%,
    Cr: 6.0 to 15.0%,
    Mo: 0.01 to 3.50%,
    O: 0.010% or less,
    N: 0.120% or less, and
    the balance being Fe and incidental impurities.

[2] The solid wire for gas metal arc welding described in [1], in which the composition further contains, in mass %, at least one selected from V: 1.0% or less, Ti: 1.0% or less, and Nb: 1.0% or less.

[3] The solid wire for gas metal arc welding described in [1] or [2], in which the composition further contains, in mass %, at least one selected from Cu: 1.00% or less, Ca: 0.010% or less, and REM: 0.020% or less.

[4] A gas metal arc welding method including welding a high-Mn steel having a Mn content of 10 to 35% by gas metal arc welding in accordance with JIS Z 3930-2013 using a solid wire for gas metal arc welding and using, as a shielding gas, a mixed gas containing 10 to 40% $CO_2$ and the balance being an inert gas Ar at a welding current of 180 to 330 A at a fume generation amount of 1200 mg/min or less, the solid wire having a composition that contains, in mass %, C: 0.20 to 0.80%,
    Si: 0.15 to 0.90%,
    Mn: 15.0 to 30.0%,
    P: 0.030% or less,
    S: 0.030% or less,
    Al: 0.020% or less,
    Ni: 0.01 to 10.00%,
    Cr: 6.0 to 15.0%,
    Mo: 0.01 to 3.50%,
    O: 0.010% or less,
    N: 0.120% or less, and
    the balance being Fe and incidental impurities.

[5] The gas metal arc welding method described in [4], in which the composition further contains, in mass %, at least one selected V: 1.0% or less, Ti: 1.0% or less, and Nb: 1.0% or less.

[6] The gas metal arc welding method described in [4] or [5], in which the composition further contains, in mass %, at least one selected from Cu: 1.00% or less, Ca: 0.010% or less, and REM: 0.020% or less.

[7] The gas metal arc welding method described in any one of [4] to [6], in which a weld joint formed by the gas metal arc welding method exhibits excellent low-temperature toughness of an absorbed energy of 28 J or more in a Charpy impact test at a test temperature of −196° C., and high strength of a room-temperature tensile strength of 400 MPa or more.

[8] A method for producing a weld joint by using the gas metal arc welding method described in any one of [4] to [7].

According to aspects of the present invention, it is possible to provide a solid wire for gas metal arc welding, with which the wire manufacturability is excellent, the amount of fume generated during gas metal arc welding can be prominently suppressed, and a weld joint having high strength and excellent cryogenic toughness can be easily manufactured by using such solid wire as a welding material for high-Mn steel materials. As a result, outstanding advantageous effects in the industry can be realized.

DETAILED DESCRIPTION OF EMBODIMENTS OF THE INVENTION

Aspects of the present invention provide a solid wire for gas metal arc welding, and the solid wire is suitable for welding a high-Mn steel material by gas metal arc welding. When the solid wire according to aspects of the present invention is used, high-Mn steel materials can be welded to each other while reducing the amount of fume generated. The solid wire according to aspects of the present invention provides a deposited metal obtained by gas metal arc welding in accordance with JIS Z 3111 having high strength of a 0.2% proof stress of 400 MPa or more at room temperature and excellent cryogenic toughness of an absorbed energy of 28 J or more in a Charpy impact test at a test temperature of −196° C. Accordingly, the solid wire according to aspects of the present invention is a welding material with which a weld joint having high strength and excellent cryogenic toughness can be manufactured.

The solid wire according to aspects of the present invention has a basic composition containing, in mass %, C: 0.20 to 0.80%, Si: 0.15 to 0.90%, Mn: 15.0 to 30.0%, P: 0.030% or less, S: 0.030% or less, Al: 0.020% or less, Ni: 0.01 to 10.00%, Cr: 6.0 to 15.0%, Mo: 0.01 to 3.50%, O: 0.010% or less, N: 0.120% or less, and the balance being Fe and incidental impurities.

First, the reasons for limiting the composition of the basic composition are described. In the description below, "mass %" is simply referred to as "%".

C: 0.20 to 0.80%

C is an element that has an effect of increasing the strength of the weld metal through solid solution strengthening, stabilizes the austenite phase, and improves the cryogenic impact toughness of the weld metal. To obtain these effects, the C content needs to be 0.20% or more. However, at a C content of more than 0.80%, carbides precipitate, the cryogenic toughness is degraded, and hot crack is likely to occur during welding. Thus, the C content is limited to the range of 0.20 to 0.80%. The C content is preferably 0.40% or more. The C content is preferably 0.60% or less.

Si: 0.15 to 0.90%

Si acts as a deoxidizer and has the effects of increasing the yield of Mn, increasing the viscosity of molten metal, stably maintaining the bead shape, and reducing the occurrence of spatter. To obtain these effects, the Si content needs to be 0.15% or more. However, at a Si content exceeding 0.90%, the cryogenic toughness of the weld metal is degraded. Furthermore, Si segregates during solidification and forms a liquid phase at the interface of solidification cells, which lowers the hot crack resistance. Thus, the Si content is limited to the range of 0.15 to 0.90%. Preferably, the Si content is 0.20% or more. Preferably, the Si content is 0.70% or less.

Mn: 15.0 to 30.0%

Mn is an inexpensive element that stabilizes the austenite phase, and the Mn content in accordance with aspects of the present invention needs to be 15.0% or more. At a Mn content of less than 15.0%, a ferrite phase is formed in the weld metal, and the cryogenic toughness is significantly degraded. Meanwhile, at a Mn content exceeding 30.0%, excessive Mn segregation occurs during solidification, causing hot crack. Thus, the Mn content is limited to the range of 15.0 to 30.0%. Preferably, the Mn content is 18.0% or more. Preferably, the Mn content is 27.0% or less.

P: 0.030% or less

P is an element that segregates at grain boundaries and causes hot crack, and the P content is preferably decreased as much as possible in accordance with aspects of the present invention although 0.030% or less is still allowable. Thus, the P content is limited to 0.030% or less. Excessive reduction increases the refining cost. Thus, the P content is preferably adjusted to 0.003% or more.

S: 0.030% or less.

S exists as a sulfide inclusion MnS in the weld metal. MnS serves as a starting point of fracture and thus degrades the cryogenic toughness. Thus, the S content is limited to 0.030% or less. Excessive reduction increases the refining cost. Thus, the S content is preferably adjusted to 0.001% or more.

Al: 0.020% or less

Al is an element that acts as a deoxidizer and is added during steel melting. At an Al content exceeding 0.020%, coarse $Al_2O_3$ is formed and serves as a starting point of fracture during wire drawing process, thereby causing wire breaking. Thus, the Al content is limited to 0.020% or less. Preferably, the Al content is 0.015% or less and more preferably less than 0.009%.

Ni: 0.01 to 10.00%

Ni is an element that strengthens austenite grain boundaries, segregates at grain boundaries, and improves the cryogenic toughness. To obtain these effects, the Ni content needs to be 0.01% or more. In addition, Ni also has the effect of stabilizing the austenite phase, and thus further increasing the Ni content stabilizes the austenite phase and improves the cryogenic toughness of the weld metal. However, Ni is expensive, and would bring an economical disadvantage if contained at more than 10.00%. Thus, the Ni content is limited to the range of 0.01 to 10.00%. Preferably, the Ni content is 0.20% or more. Preferably, the Ni content is 8.00% or less.

Cr: 6.0 to 15.0%

Cr acts as an element that stabilizes the austenite phase at cryogenic temperatures and improves the cryogenic toughness of the weld metal. Cr also has the effect of improving the strength of the weld metal. In addition, Cr works effectively to increase the liquidus of molten metal and suppress the occurrence of hot crack. Furthermore, Cr, which forms CrP in the liquid phase, has the effect of suppressing hot cracks caused by P. To obtain these effects, the Cr content needs to be 6.0% or more. At a Cr content of less than 6.0%, the aforementioned effects cannot be obtained. Meanwhile, at a Cr content exceeding 15.0%, Cr carbides occur, and the cryogenic toughness is degraded. Furthermore, occurrence of carbides degrades the workability during wire drawing. Thus, the Cr content is limited to the range of 6.0 to 15.0%. Preferably, the Cr content is 7.0% or more.

Mo: 0.01% to 3.50%

Mo is an element that strengthens austenite grain boundaries, segregates at grain boundaries, and improves the strength of the weld metal. These effects are prominent when the Mo content is 0.01% or more. At a Mo content exceeding 0.01%, Mo also has the effect of improving the strength of the weld metal through solid solution strengthening. Meanwhile, at a Mo content exceeding 3.50%, Mo precipitates as carbides, which degrade the hot workability, and degrades the wire manufacturability such as inducing cracks during wire drawing. Thus, the Mo content is limited to the range of 0.01 to 3.50%. Preferably, the Mo content is 0.1% or more. Preferably, the Mo content is 3.0% or less.

O: 0.010% or less

Oxygen (O) is an inevitable element and is separated as oxides by flotation after addition of deoxidizers such as Al, Si, and Mn. At an O content exceeding 0.010%, coarse oxides are formed, and, particularly when Al is contained in an amount exceeding 0.020%, coarse $Al_2O_3$ (oxide) is formed. The coarse oxide ($Al_2O_3$) serves as a starting point of fracture, and wire manufacturability is degraded. Thus, the oxygen (O) content is limited to 0.010% or less. Preferably, the oxygen (O) content is 0.008% or less.

N: 0.120% or less

Although N is an inevitable element, as with C, N is an element that effectively contributes to improve the strength of the weld metal, stabilizes the austenite phase, and contributes to stably improve the cryogenic toughness. These effects are prominent when the N content is 0.003% or more. Meanwhile, at a N content exceeding 0.120%, nitrides are formed, and the low-temperature toughness is degraded. Thus, the N content is limited to 0.120% or less. Preferably, the N content is 0.004% or more. Preferably, the N content is 0.080% or less.

The above-mentioned components are the basic components of the solid wire according to aspects of the present invention; however, in accordance with aspects of the present invention, in addition to the above-mentioned basic composition, at least one selected from V: 1.0% or less, Ti: 1.0% or less, and Nb: 1.0% or less, and/or at least one selected from Cu: 1.00% or less, Ca: 0.010% or less, and REM: 0.020% or less may be contained as necessary as optional components.

At least one selected from V: 1.0% or less, Ti: 1.0% or less, and Nb: 1.0% or less All of V, Ti, and Nb are elements that promote formation of carbides and contribute to improve the strength of the weld metal, and the solid wire according to aspects of the present invention may contain at least one selected from these elements as necessary.

V is a carbide-forming element, causes precipitation of fine carbides, and thereby contributes to improve the strength of the weld metal. To obtain these effects, the V content is preferably 0.001% or more; however, at a V content exceeding 1.0%, carbides coarsen and become starting points of cracks during wire drawing of the solid wire, and thus the wire drawability and the wire manufacturability are degraded. Thus, if V is to be contained, the V content is preferably limited to 1.0% or less. Preferably, the V content is 0.002% or more. Preferably, the V content is 0.8% or less.

Ti is a carbide-forming element, causes precipitation of fine carbides, and contributes to improve the strength of the weld metal. In addition, Ti causes precipitation of carbides at the interface of solidification cells of the weld metal and contributes to suppress the occurrence of hot crack. To obtain these effects, the Ti content is preferably 0.001% or more; however, at a Ti content exceeding 1.0%, carbides coarsen and become starting points of cracks during wire drawing of the solid wire, and thus the wire drawability and the wire manufacturability are degraded. Thus, if Ti is to be contained, the Ti content is preferably limited to 1.0% or less. Preferably, the Ti content is 0.002% or more. Preferably, the Ti content is 0.8% or less.

Nb is a carbide-forming element, causes precipitation of carbides, and contributes to improve the strength of the weld metal. In addition, Nb causes precipitation of carbides at the interface of solidification cells of the weld metal and contributes to suppress the occurrence of hot crack. To obtain these effects, the Nb content is preferably 0.001% or more; however, at a Nb content exceeding 1.0%, carbides coarsen and become starting points of cracks during wire drawing of the solid wire, and thus the wire drawability and the wire manufacturability are degraded. Thus, if Nb is to be contained, the Nb content is preferably limited to 1.0% or less. Preferably, the Nb content is 0.002% or more. Preferably, the Nb content is 0.8% or less.

At least one selected from Cu: 1.00% or less, Ca: 0.010% or less, and REM: 0.020% or less Cu is an element that contributes to stabilize austenite, Ca and REM are elements that contribute to improve workability, and at least one selected from Cu, Ca, and REM may be contained as necessary.

Cu is an element that stabilizes the austenite phase, stabilizes the austenite phase even at cryogenic temperatures, and thus improves the cryogenic toughness of the weld metal. To obtain these effects, the Cu content needs to be 0.01% or more. However, when Cu is contained in a large amount exceeding 1.00%, hot ductility is degraded, and the wire manufacturability is degraded. Thus, if Cu is to be contained, the Cu content is preferably limited to 1.00% or less. Preferably, the Cu content is 0.02% or more. Preferably, the Cu content is 0.8% or less.

Ca combines with S in molten metal to form a sulfide CaS with a high melting point. Since the CaS has a higher melting point than MnS, CaS remains spherical without advancing in the rolling direction during hot working of the solid wire, and thus CaS advantageously improves the workability of the solid wire. These effects are prominent when the Ca content is 0.001% or more. Meanwhile, at a Ca content exceeding 0.010%, arc is disturbed during the welding, which renders it difficult to conduct stable welding. Thus, if Ca is to be contained, the Ca content is preferably limited to 0.010% or less. Preferably, the Ca content is 0.001% or more. Preferably, the Ca content is 0.008% or less.

REM is a powerful deoxidizer and takes the form of REM oxides in the weld metal. REM oxides act as nucleation sites during solidification and thus refine crystal grains and contribute to improve the strength of the weld metal. These effects are prominent when the REM content is 0.001% or more. However, at a REM content exceeding 0.020%, stability of the arc is degraded. Thus, if REM is to be contained, the REM content is preferably limited to 0.020% or less. Preferably, the REM content is 0.002% or more. Preferably, the REM content is 0.018% or less.

The balance other than the above-mentioned components is Fe and incidental impurities.

Next, a method of manufacturing the solid wire according to aspects of the present invention is described.

Manufacturing a solid wire according to aspects of the present invention may be any common method for manufacturing solid wires for welding, and no limitation is imposed on the method except for the use of molten steel having the aforementioned composition.

Preferably, the solid wire according to aspects of the present invention is manufactured by performing the following steps sequentially: a casting step that involves smelting a molten steel having the aforementioned composition in a common smelting furnace such as an electric heating furnace or a vacuum melting furnace and casting the resulting molten steel into, for example, a mold having a predetermined shape; a heating step of heating the obtained steel ingot to a predetermined temperature; a hot rolling step of hot-rolling the heated steel ingot to obtain a steel material having a predetermined shape (rod shape); and a cold rolling step that involves cold-rolling (cold wire drawing) the obtained steel material (rod shape) multiple of times and, if necessary, annealing the steel material at an annealing temperature of 900 to 1200° C. so as to form a wire of desired dimensions.

Aspects of the present invention may also be implemented as a gas metal arc welding method. The gas metal arc welding method according to aspects of the present invention can involve welding a high-Mn steel having a Mn content of 10 to 35% by gas metal arc welding in accordance with JIS Z 3930-2013 using a solid wire for gas metal arc welding and using, as a shielding gas, a mixed gas containing 10 to 40% $CO_2$ and the balance being an inert gas Ar at a welding current of 180 to 330 A at a fume generation amount of 1200 mg/min or less, the solid wire having a composition that contains, in mass %, C: 0.20 to 0.80%,
Si: 0.15 to 0.90%,
Mn: 15.0 to 30.0%,
P: 0.030% or less,
S: 0.030% or less,
Al: 0.020% or less,
Ni: 0.01 to 10.00%,
Cr: 6.0 to 15.0%,
Mo: 0.01 to 3.50%,
O: 0.010% or less,
N: 0.120% or less, and
the balance being Fe and incidental impurities.

Furthermore, this gas metal arc welding method can be implemented as a gas metal arc welding method for forming a weld joint having excellent low-temperature toughness and high strength, exhibiting an absorbed energy of 28 J or more in a Charpy impact test at a test temperature of −196° C. and a room-temperature tensile strength of 400 MPa or more.

In the gas metal arc welding method, the chemical composition may further contain, in mass %, at least one selected from V: 1.0% or less, Ti: 1.0% or less, and Nb: 1.0% or less. The chemical composition may further contain, in mass %, at least one selected from Cu: 1.00% or less, Ca: 0.010% or less, and REM: 0.020% or less.

Aspects of the present invention can also be implemented as a method for manufacturing a weld joint by using the gas metal arc welding method described above.

The present invention will now be further described through examples.

EXAMPLES

Molten steels having compositions indicated in Table 1 were smelted in a vacuum melting furnace, and casted into 1000 kg steel ingots. The obtained steel ingots were heated to 1200° C., then hot-rolled, and then cold-rolled to obtain 1.2 mmφ solid wires for gas metal arc welding. During the manufacture of the wires, the manufacturability of each solid wire was evaluated by measuring the rolling load (drawing load), observing cracks, observing a cross section of the wire, etc. When it was judged that the rolling load (drawing load) was too high to perform a rolling (drawing) process, occurrence of cracks was observed, or the process could not further continue due to the occurrence of cracks, for example, the wire manufacturability was evaluated as "Poor". Otherwise, the wire manufacturability was evaluated as "Good".

As a comparative example, flux cored wires constituted by steel sheaths and metal powders and flux powders enclosed in the steel sheaths were prepared. A thin steel sheet (sheet thickness: 0.5 mm) that has a 0.1% C-0.2% Si-0.5% Mn-balance Fe composition in mass % was used as a steel sheath material and cold-bended in the width direction into a letter-U-shape. Metal powders and flux powders both of which components were adjusted to yield the wire compositions indicated in Table 2 were enclosed in the obtained steel sheaths, and the resulting products were cold-drawn into flux cored wires (diameter: 1.2 mmφ) for welding. The amounts of components indicated in Table 2 are the total values of the steel sheaths, the metal powders, and the flux powders.

Next, by using the obtained solid wires or flux cored wires as welding materials, gas metal arc welding was performed in a weld fume collector in accordance with JIS Z 3930, the fume generated was collected by a filter material (made of glass fibers), and fume generation amounts (mg/min) were measured. The gas metal arc welding conditions were as follows: current: 250 A, voltage: 34 V, welding speed: 30 cm/min, shielding gas: 80% Ar+20% $CO_2$ (flow rate: 20 L/min).

High-Mn steel plates for cryogenic temperatures (plate thickness: 12 mm) were prepared as test plates and butted to form a 45° V groove in accordance with JIS Z 3111, and gas metal arc welding were performed by using obtained solid wires or flux cored wires as welding materials so as to obtain deposited metals in the grooves. The high-Mn steel plates for cryogenic temperatures used as the test plates had a 0.5% C-0.4% Si-25% Mn-3% Cr-balance Fe composition in mass %.

The gas metal arc welding was performed using each solid wire (diameter: 1.2 mm) or flux cored wire (diameter: 1.2 mm) having the composition indicated in Table 1 or 2 in a flat position without preheating, where the conditions were current: 180 A to 330 A (DCEP), voltage: 24 V to 33 V, welding speed: 30 cm/min, interpass temperature: 100° C. to 150° C., shielding gas: Ar-10-40% $CO_2$.

After the welding, deposited metals were observed with an optical microscope to determine the presence or absence of weld cracks. Weld cracks are hot cracks, and samples from which cracks were observed were evaluated as "Poor" as having degraded hot crack resistance. Samples from which cracks were not observed were evaluated as "Good" as having excellent hot crack resistance.

The appearance of weld beads was observed with naked eye and evaluated. Samples from which undercut, overlap, or pit was observed were evaluated as "Poor" as having poor weld bead appearance. Samples from which none of these was observed were evaluated as "Good" as having good bead appearance.

Tensile test pieces of the deposited metals (parallel part diameter: 6 mmφ) and Charpy impact test pieces (V notch) of the deposited metals were taken from the obtained deposited metals in accordance with JIS Z 3111, and the test pieces were subjected to tensile tests and impact tests.

The tensile tests were performed at room temperature on three test pieces, and the average value of the obtained values (0.2% proof stress) was assumed to be the tensile property of the deposited metal prepared by using the corresponding wire. The Charpy impact tests were performed on three test pieces to determine absorbed energies $vE_{-196}$ at a test temperature of −196° C., and the average value thereof was assumed to be the cryogenic toughness of the deposited metal obtained by using the corresponding wire.

The results are indicated in Table 3.

TABLE 1

| Steel No. | Chemical components (mass %) | | | | | | | | | | | | | |
| | C | Si | Mn | P | S | Al | Ni | Cr | Mo | O | N | V, Ti, Nb | Cu, Ca, REM | Remarks |
|---|---|---|---|---|---|---|---|---|---|---|---|---|---|---|
| A | 0.65 | 0.58 | 26.0 | 0.012 | 0.021 | 0.004 | 6.91 | 7.2 | 1.51 | 0.003 | 0.020 | — | — | Conforming Example |
| B | 0.72 | 0.42 | 17.4 | 0.005 | 0.016 | 0.002 | 4.17 | 7.5 | 1.25 | 0.005 | 0.100 | — | — | Conforming Example |
| C | 0.55 | 0.26 | 23.4 | 0.017 | 0.024 | 0.012 | 3.10 | 7.4 | 0.01 | 0.008 | 0.081 | — | — | Conforming Example |
| D | 0.71 | 0.72 | 18.2 | 0.021 | 0.013 | 0.005 | 7.12 | 10.2 | 2.13 | 0.003 | 0.004 | — | — | Conforming Example |
| E | 0.59 | 0.21 | 20.4 | 0.026 | 0.008 | 0.001 | 1.28 | 8.2 | 1.54 | 0.001 | 0.013 | V: 0.8, Ti: 0.3 | — | Conforming Example |
| F | 0.39 | 0.37 | 27.1 | 0.013 | 0.027 | 0.004 | 2.12 | 14.7 | 0.05 | 0.002 | 0.112 | Nb: 0.2 | — | Conforming Example |
| G | 0.43 | 0.48 | 24.2 | 0.025 | 0.028 | 0.012 | 4.81 | 12.3 | 2.81 | 0.005 | 0.050 | — | Cu: 0.12 | Conforming Example |
| H | 0.51 | 0.17 | 18.2 | 0.016 | 0.024 | 0.018 | 2.46 | 9.2 | 3.20 | 0.001 | 0.006 | — | — | Conforming Example |
| I | 0.27 | 0.41 | 15.3 | 0.014 | 0.017 | 0.004 | 0.02 | 9.3 | 1.84 | 0.007 | 0.005 | — | REM: 0.011 | Conforming Example |
| J | 0.75 | 0.82 | 23.8 | 0.009 | 0.015 | 0.007 | 2.31 | 8.9 | 3.05 | 0.008 | 0.008 | — | REM: 0.011 | Conforming Example |
| K | 0.36 | 0.37 | 29.4 | 0.016 | 0.009 | 0.009 | 8.77 | 12.1 | 1.51 | 0.007 | 0.011 | Ti: 0.9 | Ca: 0.001 | Conforming Example |
| L | 0.45 | 0.75 | 21.6 | 0.016 | 0.010 | 0.013 | 3.60 | 10.5 | 0.12 | 0.002 | 0.012 | Ti: 0.1, Nb: 0.4 | Cu: 0.81, REM: 0.018 | Conforming Example |
| M | 0.48 | 0.44 | 17.2 | 0.017 | 0.008 | 0.015 | 6.25 | 6.8 | 0.32 | 0.004 | 0.090 | V: 0.1 | Ca: 0.006 | Conforming Example |
| N | 0.14 | 0.30 | 18.1 | 0.023 | 0.019 | 0.012 | 1.41 | 6.2 | 0.04 | 0.006 | 0.080 | Nb: 0.8 | — | Comparative Example |

TABLE 1-continued

| Steel | Chemical components (mass %) | | | | | | | | | | | | | |
|---|---|---|---|---|---|---|---|---|---|---|---|---|---|---|
| No. | C | Si | Mn | P | S | Al | Ni | Cr | Mo | O | N | V, Ti, Nb | Cu, Ca, REM | Remarks |
| O | 0.25 | 0.46 | 20.5 | 0.016 | 0.016 | 0.003 | 1.27 | 5.7 | 0.05 | 0.007 | 0.005 | V: 0.4, Ti: 0.2 | — | Comparative Example |
| P | 0.37 | 0.28 | 40.3 | 0.018 | 0.027 | 0.004 | 0.04 | 8.6 | 0.60 | 0.003 | 0.120 | — | Ca: 0.002, REM: 0.006 | Comparative Example |
| Q | 0.51 | 0.38 | 24.6 | 0.013 | 0.015 | 0.012 | 0.08 | 9.4 | 2.78 | 0.003 | 0.090 | Ti: 1.2, Nb: 1.5 | Ca: 0.001 | Comparative Example |
| R | 0.39 | 0.72 | 19.2 | 0.021 | 0.024 | 0.022 | 2.51 | 7.3 | 1.54 | 0.009 | 0.080 | — | — | Comparative Example |
| S | 0.42 | 0.53 | 24.6 | 0.007 | 0.008 | 0.018 | 6.13 | 8.5 | 0.82 | 0.013 | 0.004 | V: 0.2, Nb: 0.9 | — | Comparative Example |
| T | 0.46 | 0.27 | 12.8 | 0.012 | 0.006 | 0.007 | 3.14 | 9.8 | 1.24 | 0.005 | 0.050 | V: 0.1 | Cu0.57 | Comparative Example |
| U | 0.53 | 0.62 | 26.2 | 0.026 | 0.021 | 0.009 | <0.001 | 10.4 | <0.001 | 0.003 | 0.042 | — | — | Comparative Example |
| V | 0.42 | 1.50 | 18.8 | 0.025 | 0.013 | 0.013 | 4.72 | 11.8 | 0.36 | 0.005 | 0.080 | Ti: 0.4 | Cu: 0.21, Ca: 0.001 | Comparative Example |
| W | 0.47 | 0.25 | 18.2 | 0.038 | 0.021 | 0.015 | 1.29 | 14.2 | 1.28 | 0.007 | 0.090 | — | Ca: 0.007, REM: 0.013 | Comparative Example |
| X | 0.96 | 0.42 | 26.2 | 0.008 | 0.012 | 0.012 | 3.14 | 13.9 | 1.88 | 0.009 | 0.012 | — | — | Comparative Example |
| Y | 0.36 | 0.07 | 19.7 | 0.016 | 0.014 | 0.003 | 1.76 | 9.2 | 0.84 | 0.001 | 0.070 | | — | Comparative Example |

TABLE 2

| Flux cored | Chemical components (mass %) | | | | | | | | | | | | | |
|---|---|---|---|---|---|---|---|---|---|---|---|---|---|---|
| No. | C | Si | Mn | P | S | Al | Ni | Cr | Mo | O | N | V, Ti, Nb | Cu, Al, REM | Remarks |
| C1 | 0.61 | 0.34 | 18.8 | 0.012 | 0.008 | 0.009 | 2.12 | 10.4 | 1.21 | 0.140 | 0.0008 | — | — | Comparative Example |
| C2 | 0.55 | 0.31 | 26.1 | 0.003 | 0.008 | 0.002 | 0.05 | 6.9 | 1.22 | 0.120 | 0.0007 | — | — | Comparative Example |
| C3 | 0.29 | 0.55 | 24.2 | 0.024 | 0.024 | 0.017 | 2.19 | 13.7 | 0.01 | 0.180 | 0.0005 | — | — | Comparative Example |
| C4 | 0.34 | 0.28 | 18.2 | 0.016 | 0.026 | 0.012 | 6.82 | 9.4 | 2.11 | 0.160 | 0.0004 | — | — | Comparative Example |

TABLE 3

| Wire No. | Steel No./Flux cored No. | Wire manufacturability | Fume generation properties* | | | Weld metal properties** | | |
|---|---|---|---|---|---|---|---|---|
| | | | Fume generation amount (mg/min) | Hot crack resistance | Weld bead appearance | 0.2% proof stress (MPa) | Absorbed energy $vE_{-196}$ (J) | Remarks |
| 1 | A | Good | 729 | Good | Good | 496 | 76 | Example |
| 2 | B | Good | 556 | Good | Good | 455 | 46 | Example |
| 3 | C | Good | 673 | Good | Good | 421 | 80 | Example |
| 4 | D | Good | 575 | Good | Good | 523 | 52 | Example |
| 5 | E | Good | 613 | Good | Good | 481 | 41 | Example |
| 6 | F | Good | 748 | Good | Good | 518 | 76 | Example |
| 7 | G | Good | 691 | Good | Good | 567 | 73 | Example |
| 8 | H | Good | 568 | Good | Good | 504 | 57 | Example |
| 9 | I | Good | 511 | Good | Good | 428 | 49 | Example |
| 10 | J | Good | 688 | Good | Good | 537 | 68 | Example |
| 11 | K | Good | 794 | Good | Good | 576 | 64 | Example |
| 12 | L | Good | 642 | Good | Good | 458 | 70 | Example |
| 13 | M | Good | 551 | Good | Good | 416 | 83 | Example |
| 14 | N | Good | 566 | Good | Good | 370 | 48 | Comparative Example |
| 15 | O | Good | 616 | Poor | Good | 373 | 68 | Comparative Example |
| 16 | P | Good | 1011 | Poor | Good | 499 | 52 | Comparative Example |
| 17 | Q | Poor | *** | *** | *** | *** | *** | Comparative Example |
| 18 | R | Poor | *** | *** | *** | *** | *** | Comparative Example |
| 19 | S | Poor | *** | *** | *** | *** | *** | Comparative Example |
| 20 | T | Good | 461 | Good | Good | 439 | 11 | Comparative Example |
| 21 | U | Good | 733 | Good | Good | 451 | 16 | Comparative Example |

TABLE 3-continued

| Wire No. | Steel No./Flux cored No. | Wire manufacturability | Fume generation amount (mg/min) | Hot crack resistance | Weld bead appearance | 0.2% proof stress (MPa) | Absorbed energy $vE_{-196}$ (J) | Remarks |
|---|---|---|---|---|---|---|---|---|
| 22 | V | Good | 593 | Poor | Good | 484 | 14 | Comparative Example |
| 23 | W | Good | 571 | Poor | Good | 507 | 71 | Comparative Example |
| 24 | X | Good | 731 | Poor | Good | 586 | 42 | Comparative Example |
| 25 | Y | Good | 597 | Good | Poor | 432 | 53 | Comparative Example |
| 26 | C1 | Good | 1747 | Good | Good | 466 | 49 | Comparative Example |
| 27 | C2 | Good | 2184 | Good | Good | 440 | 72 | Comparative Example |
| 28 | C3 | Good | 2073 | Good | Good | 474 | 63 | Comparative Example |
| 29 | C4 | Good | 1706 | Good | Good | 486 | 40 | Comparative Example |

*In accordance with JIS Z 3930-2013.
**In accordance with JIS Z 3111.
***) Unmeasurable.

All of Examples of the present invention have excellent wire manufacturability and can be regarded as welding materials that generate less fume, that is, the amounts of fume generated when gas metal arc welding are performed with a welding current of 250 A in accordance with JIS Z 3930-2013 are 1200 mg/min or less.

In addition, all of Examples of the present invention were free of weld cracks (hot cracks) during welding and thus had excellent hot crack resistances and can be considered to be welding materials from which deposited metals having excellent weld bead appearances are obtained.

Furthermore, all Examples had yield strengths (0.2% proof stress) of 400 MPa or more at room temperature and absorbed energies $vE_{-196}$ of 28 J or more in the Charpy impact test at a test temperature of −196° C. Thus, all Examples can be regarded as welding materials (solid wires) with which weld metals having both high strength and excellent cryogenic toughness can be obtained.

In contrast, in each Comparative Example outside the scope of the present invention, either the amount of fume generated was more than 1200 mg/min, the wire manufacturability was poor, welding cracks (hot cracks) had occurred and had degraded hot crack resistance, the weld bead was defective and had poor appearance, the 0.2% proof stress was less than 400 MPa at room temperature, or the absorbed energy $vE_{-196}$ was less than 28 J. Thus, in Comparative Examples, a deposited metal with which less fume is generated during welding, and which has both high strength and excellent cryogenic toughness was not obtained.

The wire No. 14 of Comparative Example had a C content below the range according to aspects of the present invention, and the wire No. 15 of Comparative Example had a Cr content below the range according to aspects of the present invention. Thus, the 0.2% proof stresses of the deposited metals were less than 400 MPa, and the desired high strength was not achieved. In the wire No. 15, furthermore, hot cracks had occurred.

The wire No. 16 of Comparative Example had a Mn content above the range according to aspects of the present invention, and thus hot cracks had occurred.

The wire No. 17 of Comparative Example had a Ti content and a Nb content above the ranges according to aspects of the present invention, the wire No. 18 of Comparative Example had an Al content above the range according to aspects of the present invention, and the wire No. 19 of Comparative Example had an oxygen (O) content above the range according to aspects of the present invention. Thus, the wire drawabilities were degraded, and the wires could not be drawn to a desired wire diameter.

The wire No. 20 of Comparative Example had a Mn content below the range according to aspects of the present invention, and thus the stability of the austenite phase was low, and the cryogenic toughness was degraded to less than 28 J in terms of the absorbed energy $vE_{-196}$.

The wire No. 21 of Comparative Example had a Ni content below the range according to aspects of the present invention, and thus the cryogenic toughness was degraded to less than 28 J in terms of the absorbed energy $vE_{-196}$.

The wire No. 22 of Comparative Example had a Si content above the range according to aspects of the present invention, the wire No. 23 of Comparative Example had a P content above the range according to aspects of the present invention, and the wire No. 24 of Comparative Example had a C content above the range according to aspects of the present invention. Thus, hot cracks had occurred, and hot crack resistance was degraded. The wire No. 22 also had degraded cryogenic toughness, since the absorbed energy $vE_{-196}$ was less than 28 J.

The wire No. 25 of Comparative Example had a Si content below the range according to aspects of the present invention, and thus good bead shape was not obtained, and pits occurred. Each of wires No. 26, No. 27, No. 28, and No. 29 is a flux cored wire, and a large amount of fume exceeding 1200 mg/min had been generated during welding.

The invention claimed is:
1. A solid wire for gas metal arc welding, the solid wire comprising a composition that contains, in mass %,
C: 0.20 to 0.80%,
Si: 0.15 to 0.90%,
Mn: 15.0 to 30.0%,
P: 0.030% or less,
S: 0.030% or less,
Al: 0.020% or less,
Ni: 0.01 to 10.00%,
Cr: 6.0 to 15.0%,
Mo: 0.01 to 3.50%,
O: 0.010% or less,
N: 0.120% or less, and
the balance being Fe and incidental impurities.

2. The solid wire for gas metal arc welding according to claim 1, wherein the composition further contains at least one selected from the groups A and B, in mass %, Group A: at least one selected from V: 1.0% or less, Ti: 1.0% or less, and Nb: 1.0% or less; and Group B: at least one selected from Cu: 1.00% or less, Ca: 0.010% or less, and REM: 0.020% or less.

3. A gas metal arc welding method comprising welding a high-Mn steel having a Mn content of 10 to 35% by gas metal arc welding in accordance with JIS Z 3930-2013 using a solid wire for gas metal arc welding and using, as a shielding gas, a mixed gas containing 10 to 40% $CO_2$ and the balance being an inert gas Ar at a welding current of 180 to 330 A at a fume generation amount of 1200 mg/min or less, the solid wire having a composition that contains, in mass %, C: 0.20 to 0.80%,
Si: 0.15 to 0.90%,
Mn: 15.0 to 30.0%,
P: 0.030% or less,
S: 0.030% or less,
Al: 0.020% or less,
Ni: 0.01 to 10.00%,
Cr: 6.0 to 15.0%,
Mo: 0.01 to 3.50%,
O: 0.010% or less,
N: 0.120% or less, and
the balance being Fe and incidental impurities.

4. The gas metal arc welding method according to claim 3, wherein the composition further contains, at least one selected from the groups A and B, in mass %, Group A: at least one selected V: 1.0% or less, Ti: 1.0% or less, and Nb: 1.0% or less; and Group B: at least one selected from Cu: 1.00% or less, Ca: 0.010% or less, and REM: 0.020% or less.

5. The gas metal arc welding method according to claim 4, wherein a weld joint formed by the gas metal arc welding method exhibits excellent low-temperature toughness of an absorbed energy of 28 J or more in a Charpy impact test at a test temperature of −196° C., and high strength of a room-temperature tensile strength of 400 MPa or more.

6. The gas metal arc welding method according to claim 3, wherein a weld joint formed by the gas metal arc welding method exhibits excellent low-temperature toughness of an absorbed energy of 28 J or more in a Charpy impact test at a test temperature of −196° C., and high strength of a room-temperature tensile strength of 400 MPa or more.

7. A method for producing a weld joint by using the gas metal arc welding method according to claim 4.

8. A method for producing a weld joint by using the gas metal arc welding method according to claim 4.

9. A method for producing a weld joint by using the gas metal arc welding method according to claim 6.

10. A method for producing a weld joint by using the gas metal arc welding method according to claim 5.

* * * * *